US011993134B2

(12) United States Patent
Oh et al.

(10) Patent No.: US 11,993,134 B2
(45) Date of Patent: May 28, 2024

(54) REFRIGERANT MODULE OF INTEGRATED THERMAL MANAGEMENT SYSTEM FOR VEHICLE

(71) Applicants: Hyundai Motor Company, Seoul (KR); Kia Corporation, Seoul (KR); Hyundai Wia Corporation, Gyeongsangnam-do (KR)

(72) Inventors: Man Ju Oh, Gyeonggi-do (KR); Sang Shin Lee, Gyeonggi-do (KR); Ki Mok Kim, Busan (KR); Man Hee Kim, Seoul (KR); Se Min Lee, Gyeonggi-do (KR); Bong Jun Park, Gyeonggi-do (KR)

(73) Assignees: Hyundai Motor Company, Seoul (KR); Kia Corporation, Seoul (KR); Hyundai Wia Corporation, Gyeongsangnam-do (KR)

( * ) Notice: Subject to any disclaimer, the term of this patent is extended or adjusted under 35 U.S.C. 154(b) by 0 days.

(21) Appl. No.: 17/972,323

(22) Filed: Oct. 24, 2022

(65) Prior Publication Data

US 2023/0143363 A1    May 11, 2023

(30) Foreign Application Priority Data

Nov. 11, 2021   (KR) ........................ 1020210154977

(51) Int. Cl.
*B60H 1/32*       (2006.01)
*B60H 1/00*       (2006.01)
(52) U.S. Cl.
CPC ....... *B60H 1/3229* (2013.01); *B60H 1/00385* (2013.01); *F25B 2500/18* (2013.01)

(58) Field of Classification Search
CPC .... F25B 2500/18; F25B 43/006; F25B 41/31; F25B 2500/02; F25B 2500/01; B60H 1/00528
See application file for complete search history.

(56) References Cited

U.S. PATENT DOCUMENTS

| 1,438,178 A | * | 12/1922 | Heideman | ............... F25B 41/31 |
| | | | | 137/505.41 |
| 5,245,836 A | | 9/1993 | Lorentzen et al. | |

(Continued)

OTHER PUBLICATIONS

Non-Final Office Action dated Oct. 12, 2023 in U.S. Appl. No. 17/972,287.

(Continued)

*Primary Examiner* — David J Teitelbaum
(74) *Attorney, Agent, or Firm* — Fox Rothschild LLP (57) ABSTRACT

A refrigerant module of an integrated thermal management system of a vehicle is provided in which components of the module may be compactified by modularizing the components related to a refrigerant. In the refrigerant module of the integrated thermal management system for the vehicle in which the refrigerant module is configured such that a refrigerant circulates through a compressor, a condenser, an expansion valve, an evaporator, and an accumulator, the refrigerant module includes the compressor having a first suction port and a first discharge port, the condenser having a second suction port and a second discharge port, the expansion valve having a third suction port and a third discharge port, the evaporator having a fourth suction port and a fourth discharge port, the accumulator having a fifth suction port and a fifth discharge port, and a connection passage enabling the refrigerant discharged from the accumulator to flow to the compressor.

9 Claims, 6 Drawing Sheets

(56) References Cited

U.S. PATENT DOCUMENTS

| | | | |
|---|---|---|---|
| 6,105,386 A | 8/2000 | Kuroda et al. | |
| 6,167,713 B1* | 1/2001 | Hartfield | F25B 39/028 |
| | | | 165/DIG. 171 |
| 6,178,761 B1 | 1/2001 | Karl | |
| 6,523,360 B2 | 2/2003 | Watanabe et al. | |
| 6,584,796 B2 | 7/2003 | Itoh et al. | |
| 6,640,559 B1* | 11/2003 | McQuade | B01D 45/06 |
| | | | 62/84 |
| 6,857,280 B1 | 2/2005 | Yamanaka et al. | |
| 2004/0237577 A1 | 12/2004 | Nishida et al. | |
| 2005/0262873 A1 | 12/2005 | Hirota | |
| 2006/0137385 A1 | 6/2006 | Take et al. | |
| 2006/0185825 A1* | 8/2006 | Chen | F28D 15/0266 |
| | | | 165/104.21 |
| 2007/0125106 A1 | 6/2007 | Ishikawa et al. | |
| 2007/0227165 A1 | 10/2007 | Ohta | |
| 2008/0060365 A1 | 3/2008 | Sakitani et al. | |
| 2009/0260386 A1 | 10/2009 | Wittmann et al. | |
| 2010/0155017 A1 | 6/2010 | Lemee et al. | |
| 2012/0216562 A1* | 8/2012 | Kadle | F28D 9/0093 |
| | | | 62/434 |
| 2019/0039440 A1 | 2/2019 | Calderone | |
| 2020/0086711 A1 | 3/2020 | Kim et al. | |
| 2022/0402328 A1 | 12/2022 | Kim et al. | |
| 2023/0143363 A1 | 5/2023 | Oh et al. | |

OTHER PUBLICATIONS

Non-Final Office Action issued Feb. 14, 2024 in U.S. Appl. No. 17/969,861.

* cited by examiner

REFRIGERANT MODULE OF INTEGRATED THERMAL MANAGEMENT SYSTEM FOR
VEHICLE

CROSS REFERENCE TO RELATED APPLICATION

The present application claims, under 35 U.S.C. § 119(a), the benefit of Korean Patent Application No. 10-2021-0154977, filed Nov. 11, 2021, the entire contents of which are incorporated herein for all purposes by reference.

BACKGROUND OF THE DISCLOSURE

Field of the Disclosure

The present disclosure relates to a refrigerant module of an integrated thermal management system for a vehicle. More particularly, the present disclosure relates to a refrigerant module of an integrated thermal management system for a vehicle in which components related to a refrigerant are modularized so that the components are compactified.

Background

Recently, due to environmental issues of an internal combustion engine vehicle, the dissemination of an eco-friendly vehicle such as an electric vehicle is increasing. In a conventional internal combustion engine vehicle, additional energy for heating is not required since an inside of a vehicle can be heated by using waste heat of an engine. However, in the eco-friendly vehicle such as an electric vehicle and so on, since there is no heat source such as an engine, additional energy is required to perform heating, so that there was a problem that fuel efficiency of the eco-friendly vehicle is decreased.

In addition, an issue such as a decrease in fuel efficiency of the electric vehicle has been a factor reducing a drivable distance of the electric vehicle, and this causes inconveniences such as a need for frequent charging and so on.

Therefore, in an air conditioning apparatus of the eco-friendly vehicle such as the electric vehicle, a heat pump system that is different from a heat pump system of an air conditioning apparatus of the internal combustion engine vehicle has been applied.

Generally, a heat pump system is a cooling and heating apparatus that transfers heat from a low-temperature heat source to a high-temperature space or transfers heat from a high-temperature heat source to a low-temperature space by using generated heat or condensation heat of a refrigerant. Further, the heat pump system is configured to absorb heat of the outside and to release the absorbed heat to an inside of a vehicle when a heating operation is performed, and is configured to release heat of the inside of the vehicle to the outside when a cooling operation is performed.

However, in the eco-friendly vehicle such as the electric vehicle, demand for thermal management of electric components such as a battery, a motor, and so on are added in addition to the air conditioning apparatus.

That is, in an inner space, the battery, and the electric components that are applied in the eco-friendly vehicle such as the electric vehicle, demands for air conditioning are different from each other, so that a technology capable of independently managing and efficiently cooperating with inner space, the battery, and the electric components such that energy is maximally conserved is required. Therefore, in order to improve thermal efficiency by integrating thermal management of the entire vehicle while independently performing thermal management for each configuration, an integrated thermal management concept has been proposed.

In order to perform the integrated thermal management of the vehicle, it is necessary to integrate and modularize coolant lines, refrigerant lines, and components that are complexly structured. Therefore, a concept of modularization in which multiple components are modularized and are easy to manufacture and are compact in terms of packaging is required.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and an aspect of the present disclosure is to provide a refrigerant module of an integrated thermal management system for a vehicle in which components may be compactified by integrating and modularizing complex components related to a refrigerant and lines.

In order to achieve the above aspect, according to one aspect of the present disclosure, there is provided a refrigerant module of an integrated thermal management system for a vehicle in which the refrigerant module is configured such that a refrigerant circulates through a compressor, a condenser, an expansion valve, an evaporator, and an accumulator, the refrigerant module including: a compressor having a first suction port into which the refrigerant is suctioned and having a first discharge port through which the refrigerant that is compressed is discharged; a condenser having a second suction port into which the refrigerant discharged from the compressor is suctioned and having a second discharge port through which the refrigerant that is heat-exchanged is discharged; an expansion valve having a third suction port into which the refrigerant discharged from the condenser is suctioned and having a third discharge port through which the refrigerant that is expanded is discharged; an evaporator having a fourth suction port into which the refrigerant discharged from the expansion valve is suctioned and having a fourth discharge port through which the refrigerant that is heat-exchanged is discharged; an accumulator having a fifth suction port into which the refrigerant discharged from the evaporator is suctioned and having a fifth discharge port through which the refrigerant separated into liquid and gas phases is discharged; and a connection passage enabling the refrigerant discharged from the accumulator to flow to the compressor.

In another aspect, the refrigerant module further comprises a refrigerant.

The first discharge port of the compressor may be directly connected to the second suction port of the condenser, the second discharge port of the condenser may be directly connected to the third suction port of the expansion valve, the third discharge port of the expansion valve may be directly connected to the fourth suction port of the evaporator, the fourth discharge port of the evaporator may be directly connected to the fifth suction port of the accumulator, and the fifth discharge port of the accumulator may be indirectly connected to the first suction port of the compressor by the connection passage.

The first discharge port may be oriented in an upward direction from an upper end portion of the compressor, the second suction port may be oriented in a downward direction from a lower end portion of the condenser, and the second suction port of the condenser may be disposed directly above the first discharge port of the compressor such that the first discharge port and the second suction port are directly connected to each other and are in communication with each other.

The second discharge port may be oriented in a downward direction from a lower end portion of the condenser, the third suction port may be oriented in an upward direction from an upper end portion of the expansion valve, and the third suction port of the expansion valve may be disposed directly below the second discharge port of the condenser such that the second discharge port and the third suction port are directly connected to each other and are in communication with each other.

The third discharge port may be oriented in an upward direction from an upper end portion of the expansion valve, the fourth suction port may be oriented in a downward direction from a lower end portion of the evaporator, and the fourth suction port of the evaporator may be disposed directly above the third discharge port of the expansion valve such that the third discharge port and the fourth suction port are directly connected to each other and are in communication with each other.

The fourth discharge port may be oriented in a downward direction from a lower end portion of the evaporator, the fifth suction port may be oriented in an upward direction from an upper end portion of the accumulator, and the fifth suction port of the accumulator may be disposed directly below the fourth discharge port of the evaporator such that the fourth discharge port and the fifth suction port are directly connected to each other and are in communication with each other.

The fifth discharge port may be oriented in an upward direction from an upper end portion of the accumulator, the first suction port may be oriented in an upward direction from an upper end portion of the compressor, and the fifth discharge port of the accumulator and the first suction port of the compressor may be disposed to be spaced apart from each other in a horizontal direction and may be indirectly connected to each other by the connection passage.

The connection passage may be formed in a hollow pipe shape so that the refrigerant flows through an internal portion of the connection passage, the connection passage may have a first end thereof provided with a suction flange that is directly connected to the fifth discharge port of the accumulator and may have a second end thereof provided with a discharge flange that is directly connected to the first suction port of the compressor, and opposite side end regions of the connection passage may be bent downward, so that the suction flange may be disposed directly above the fifth discharge port of the accumulator and the discharge flange may be disposed directly above the first suction port of the compressor.

The refrigerant module may further include a fixing plate portion that is configured to fix the compressor, the condenser, the expansion valve, the evaporator, and the accumulator.

The compressor and the accumulator may be disposed side by side in a horizontal direction, the condenser and the evaporator may be disposed side by side in the horizontal direction on a region above the compressor and the accumulator, and the fixing plate portion may include a first vertical plate oriented in a vertical direction and fixed to a vehicle body of the vehicle, and a first horizontal plate horizontally fixed to a middle portion of the first vertical plate, wherein the compressor and the accumulator may be fixed to a lower surface of the first horizontal plate, the condenser and the evaporator may be fixed to an upper surface of the first horizontal plate, and opposite sides of an upper end of the expansion valve may be respectively fixed to a lower end portion of the condenser and a lower end portion of the evaporator.

The compressor and the accumulator may be disposed side by side in a horizontal direction, the condenser and the evaporator may be disposed side by side in the horizontal direction on a region above the compressor and the accumulator, and the fixing plate portion may include a second horizontal plate oriented in a horizontal direction and fixed to a vehicle body of the vehicle, and a second vertical plate vertically fixed to a middle portion of the second horizontal plate, wherein the compressor and the accumulator may be fixed to an upper surface of the second horizontal plate, the condenser and the evaporator may be respectively fixed to opposite side surfaces of the second vertical plate, and opposite sides of an upper end of the expansion valve may be respectively fixed to a lower end portion of the condenser and a lower end portion of the evaporator.

According to an exemplary embodiment of the present disclosure, since the components related to the refrigerant and the lines are integrated and modularized, the components may be compactified.

According to an exemplary embodiment of the present disclosure, since a path through which the refrigerant circulates may be reduced to a minimum, the amount of the refrigerant that is circulated may be reduced, and also the heat exchange efficiency of the refrigerant with a coolant may be increased.

In another aspect, a vehicle is provided that comprises a refrigerant module of an integrated thermal management system, as disclosed herein. In an additional aspect, a vehicle is provided that comprises a refrigerant module of an integrated thermal management system, as disclosed herein, where the refrigerant module further contains a refrigerant.

Other aspects are disclosed infra.

BRIEF DESCRIPTION OF THE DRAWINGS

The above and other aspects, features, and other advantages of the present disclosure will be more clearly understood from the following detailed description when taken in conjunction with the accompanying exemplary drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some exemplary embodiments of the present disclosure will be described in detail with reference to the accompanying exemplary drawings. However, the present disclosure is not limited to the embodiments disclosed below, but may be implemented in various different forms. The present embodiments are provided so that this disclosure will be thorough and complete, and will fully convey the scope of the present disclosure to those skilled in the art. The same reference numerals indicated in each drawing denote the same or equivalent components. In addition, a detailed description of well-known features or functions will be ruled out in order not to unnecessarily obscure the gist of the present disclosure.

Figure 1:
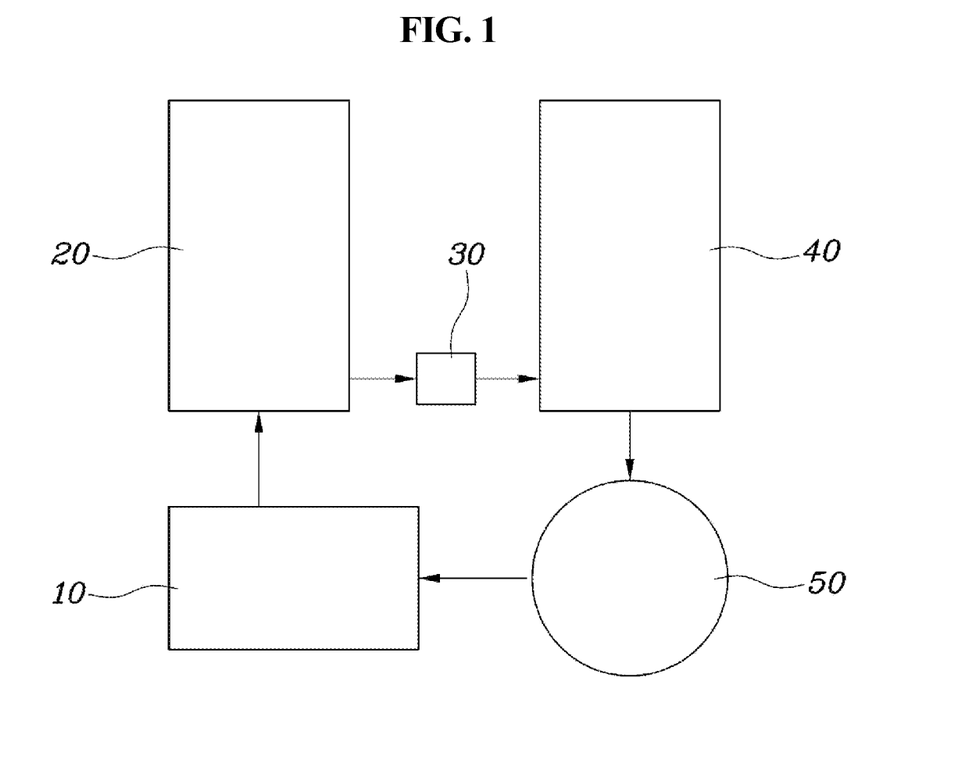
FIG. 1 is a view illustrating a configuration of components configuring a refrigerant module of an integrated thermal management system for a vehicle according to an exemplary embodiment of the present disclosure.

FIG. 1 is a view illustrating a configuration of components configuring a refrigerant module of an integrated thermal management system for a vehicle according to an exemplary embodiment of the present disclosure.

As illustrated in FIG. 1, the refrigerant module of the integrated thermal management system for the vehicle according to an exemplary embodiment of the present disclosure is configured such that a refrigerant circulates through a compressor 10, a condenser 20, an expansion valve 30, an evaporator 40, and an accumulator 50 in order.

That is, the refrigerant is compressed in the compressor 10 and then flows into the condenser 20, so that the refrigerant exchanges heat with a coolant, thereby dissipating heat. The heat-dissipated refrigerant flows into the expansion valve 30, and the refrigerant expands. In addition, the refrigerant that expands in the expansion valve 30 flows into the evaporator 40, and absorbs heat by exchanging heat with the coolant, and then the refrigerant flows into the accumulator 50. In the accumulator 50, the refrigerant in a gas phase and the refrigerant in a liquid phase are separated from each other, and then the refrigerant in the gas phase flows into the compressor 10.

As such, the refrigerant circulates through the compressor 10, the condenser 20, the expansion valve 30, the evaporator 40, and the accumulator 50 in order, and exchanges heat with the coolant, so that coolant is heated or cooled.

Meanwhile, conventionally, a refrigerant that is circulated between a compressor, a condenser, an expansion valve, an evaporator, and an accumulator flows through a connection pipe or a connection hose which is connecting each component to each other. However, in the present disclosure, an arrangement of the compressor 10, the condenser 20, the expansion valve 30, the evaporator 40, and the accumulator 50 is improved so that the components are directly connected to each other. Accordingly, a connection pipe or a connection hose through which a refrigerant flows is removed or minimized, so that lines and components related to the refrigerant are modularized.

Figure 2:
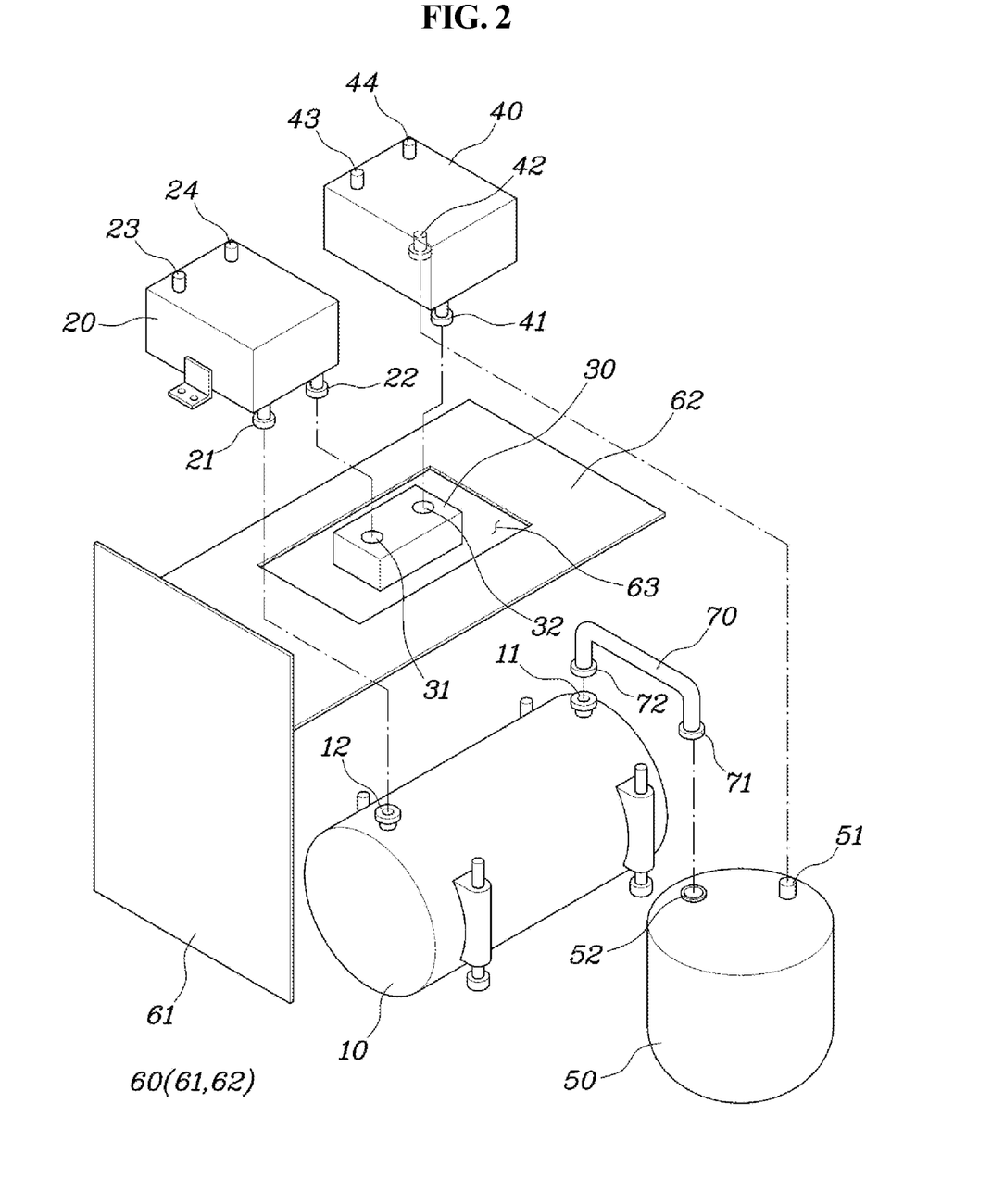
FIG. 2 is an exploded perspective view illustrating the refrigerant module of the integrated thermal management system for the vehicle according to an exemplary embodiment of the present disclosure.
Figure 3:
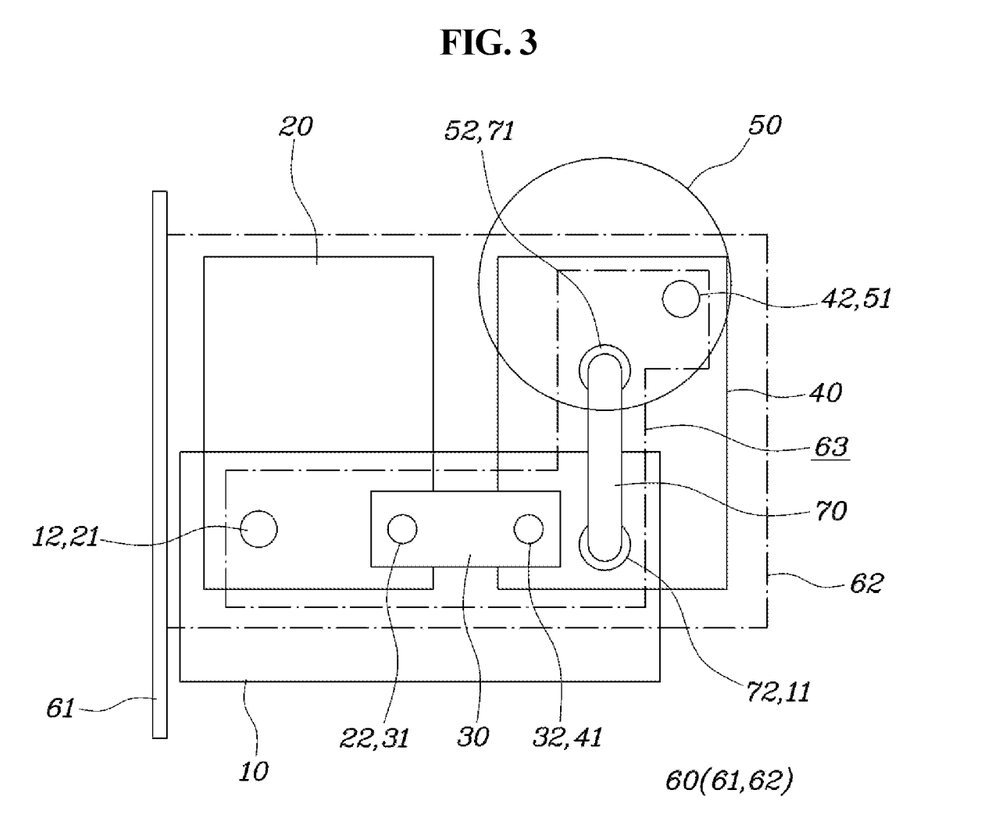
FIG. 3 is a plan view illustrating the refrigerant module of the integrated thermal management system for the vehicle according to an exemplary embodiment of the present disclosure.

FIG. 2 is an exploded perspective view illustrating the refrigerant module of the integrated thermal management system for the vehicle according to an exemplary embodiment of the present disclosure, and FIG. 3 is a plan view illustrating the refrigerant module of the integrated thermal management system for the vehicle according to an exemplary embodiment of the present disclosure.

As illustrated in the exemplary drawings, the refrigerant module of the integrated thermal management system for the vehicle according to an exemplary embodiment of the present disclosure is configured such that the lines and the components related to the refrigerant are modularized. Further, the compressor 10, the condenser 20, the expansion valve 30, the evaporator 40, and the accumulator 50 are provided as the components related to the refrigerant, and only one connection passage 70 into which the refrigerant flows is provided between the compressor 10 and the accumulator 50.

Here, in the compressor 10, the condenser 20, the expansion valve 30, the evaporator 40, and the accumulator 50, each of the components may be manufactured in various forms capable of performing a function of a corresponding component. Particularly, as long as the compressor 10, the condenser 20, the expansion valve 30, the evaporator 40, and the accumulator 50 perform the function of the corresponding component, internal configurations of the compressor 10, the condenser 20, the expansion valve 30, the evaporator 40, and the accumulator 50 are not limited.

However, in the exemplary embodiment, in order to minimize the lines into which the refrigerant flows by improving an arrangement relationship and a connection relationship of the compressor 10, the condenser 20, the expansion valve 30, the evaporator 40, and the accumulator 50, both positions of ports and directions of opening portions, into which the refrigerant flows, in the compressor 10, the condenser 20, the expansion valve 30, the evaporator 40, and the accumulator 50 are limited.

That is, on the compressor 10, a first suction port 11 into which the refrigerant is suctioned from the accumulator 50 is provided, and a first discharge port 12 through which the refrigerant that is compressed is discharged is provided. On the condenser 20, a second suction port 21 into which the refrigerant that is discharged from the compressor 10 is suctioned is provided, and a second discharge port 22 through which the refrigerant that is heat-exchanged is discharged is provided. At this time, on the condenser 20, a first inlet port 23 into which the coolant that exchanges heat with the refrigerant is introduced is provided, and a first exhaust port 24 through which the heat-exchanged coolant is exhausted is provided.

In addition, on the expansion valve 30, a third suction port 31 into which the refrigerant that is discharged from the condenser 20 is suctioned is provided, and a third discharge port 32 through which the refrigerant that is expanded is discharged is provided. On the evaporator 40, a fourth suction port 41 into which the refrigerant that is discharged from the expansion valve 30 is suctioned is provided, and a fourth discharge port 42 through which the refrigerant that is heat-exchanged is discharged is provided. At this time, on the evaporator 40, a second inlet port 43 into which the coolant that exchanges heat with the refrigerant is introduced is provided, and a second exhaust port 44 through which the heat-exchanged coolant is exhausted is provided.

In addition, on the accumulator 50, a fifth suction port 51 into which the refrigerant that is discharged from the evaporator 40 is suctioned is provided, and a fifth discharge port 52 through which the refrigerant that is separated into liquid and gas phases is discharged is provided. In addition, between the accumulator 50 and the compressor 10, the connection passage 70 into which the refrigerant discharged from the accumulator 50 flows to the compressor 10 is disposed.

Therefore, according to an order in which the refrigerant flows, the first discharge port 12 of the compressor 10 is directly connected to the second suction port 21 of the condenser 20, and the second discharge port 22 of the condenser 20 is directly connected to the third suction port 31 of the expansion valve 30.

In addition, the third discharge port 32 of the expansion valve 30 is directly connected to the fourth suction port 41 of the evaporator 40, and the fourth discharge port 42 of the evaporator 40 is directly connected to the fifth suction port 51 of the accumulator 50.

However, the fifth discharge port 52 of the accumulator 50 is indirectly connected to the first suction port 11 of the compressor 10 via the connection passage 70.

For this connection, the compressor 10 and the accumulator 50 are disposed side by side in a horizontal direction, and the condenser 20 and the evaporator 40 are disposed side by side in the horizontal direction on a position above the compressor 10 and the accumulator 50. In addition, the expansion valve 30 is disposed such that opposite sides of an upper end of the expansion valve 30 are respectively fixed to a lower end portion of the condenser 20 and a lower end portion of the evaporator 40.

In addition, by this arrangement described above, the ports of the compressor 10 and the accumulator 50, into which the refrigerant is suctioned and discharged, are oriented in an upward direction.

For example, the first suction port 11 and the first discharge port 12 are oriented on an upper end portion of the compressor 10 and are directed upward. In addition, similarly, the fifth suction port 51 and the fifth discharge port 52 are oriented in the upward direction from an upper end portion of the accumulator 50.

On the other hand, the ports of the condenser 20 and the evaporator 40, into which the refrigerant is suctioned and discharged, are oriented in a downward direction.

For example, the second suction port 21 and the second discharge port 22 are oriented in the downward direction from the lower end portion of the condenser 20. In addition, similarly, the fourth suction port 41 and the fourth discharge port 42 are oriented in the downward direction from the lower end portion of the evaporator 40.

In addition, the expansion valve 30 is oriented such that both the third suction port 31 and the third discharge port 32, into which the refrigerant is suctioned and discharged, are directed to the upward direction from the upper end portion of the expansion valve 30.

Therefore, the condenser 20 is disposed above the compressor 10 such that the second suction port 21 of the condenser 20 is disposed directly above the first discharge port 12 of the compressor 10, and the first discharge port 12 is directly connected to the second suction port 21, so that the refrigerant directly flows between the compressor 10 and the condenser 20 without an additional connection component.

In addition, after the evaporator 40 is disposed in the horizontal direction with respect to the condenser 20, the accumulator 50 is disposed below the condenser 20 such that the fifth suction port 51 of the accumulator 50 is disposed directly below the fourth discharge port 42 of the evaporator 40, and the fourth discharge port 42 is directly connected to the fifth suction port 51, so that the refrigerant directly flows between the evaporator 40 and the accumulator 50 without an additional connection component.

In addition, after the expansion valve 30 is disposed below the condenser 20 and the evaporator 40, the third suction port 31 of the expansion valve 30 is disposed directly below the second discharge port 22 of the condenser 20, and the fourth suction port 41 of the evaporator 40 is disposed directly above the third discharge port 32 of the expansion valve 30. Therefore, the second discharge port 22 is directly connected to the third suction port 31 so that the refrigerant directly flows between the condenser 20 and the expansion valve 30 without an additional connection component, and the third suction port 32 is directly connected to the fourth suction port 41 so that the refrigerant directly flows between the expansion valve 30 and the evaporator 40 without an additional connection component.

However, in order to suction the refrigerant that is discharged from the accumulator 50 into the compressor 10, the fifth discharge port 52 of the accumulator 50 is required to be connected to the first suction port 11 of the compressor 10, but the first suction port 11 of the compressor 10 and the fifth discharge port 52 of the accumulator 50 are oriented in the upward direction and the compressor 10 and the accumulator 50 are disposed side by side in the horizontal direction. Therefore, the first suction port 11 is indirectly connected to the fifth discharge port 52 by disposing the connection passage 70.

To this end, the connection passage 70 is manufactured in a hollow pipe shape such that the refrigerant flows through an inner portion of the connection passage 70. In addition, a suction flange 71 directly connected to the fifth discharge port 52 of the accumulator 50 is provided on a first end of the connection passage 70, and a discharge flange 72 directly connected to the first suction port 11 of the compressor 10 is provided on a second end of the connection passage 70.

At this time, opposite end regions of the connection passage 70 are bent downward, and the suction flange 71 is disposed directly above the fifth discharge port 52 of the accumulator 50 and the discharge flange 72 is disposed directly above the first suction port 11 of the compressor 10. Further, the suction flange 71 is connected to the fifth discharge port 52, and the discharge flange 72 is connected to the first suction port 11.

Meanwhile, in the refrigerant module of the integrated thermal management system for the vehicle configured as described above, a fixing plate portion 60 may be further included so that the compressor 10, the condenser 20, the expansion valve 30, the evaporator 40, and the accumulator 50 are fixed to respective positions thereof.

At this time, the fixing plate portion 60 may be realized in various forms capable of maintaining a relationship in which the compressor 10 and the accumulator 50 are disposed side by side in the horizontal direction and the condenser 20 and the evaporator 40 are disposed side by side in the horizontal direction above the compressor 10 and the accumulator 50.

For example, as illustrated in FIG. 2, the fixing plate portion 60 may include a first vertical plate 61 oriented in a vertical direction and fixed to a vehicle body of the vehicle, and may include a first horizontal plate 62 horizontally fixed to a middle portion of the first vertical plate 61.

Therefore, each of the compressor 10 and the accumulator 50 is fixed to a lower surface of the first horizontal plate 62, and each of the condenser 20 and the evaporator 40 is fixed to an upper surface of the first horizontal plate 62. In addition, the expansion valve 30 is disposed such that the opposite sides of the upper end of the expansion valve 30 are respectively fixed to the lower end portion of the condenser 20 and the lower end portion of the evaporator 40. At this time, a bracket formed in various shapes may be used to fix the compressor 10, the accumulator 50, the condenser 20, and the evaporator 40 to the first horizontal plate 62.

Meanwhile, a through-hole 63 may be formed in the first horizontal plate 62 so as to secure a space where the expansion valve 30 is disposed, a space where the first discharge port 12 of the compressor 10 and the second suction port 21 of the condenser 20 are directly connected to each other, and a space where the fourth discharge port 42 of the evaporator 40 and the fifth suction port 51 of the accumulator 50 are directly connected to each other. At this time, the shape of the through-hole 63 may be variously formed in consideration of the expansion valve 30 and the connection of each of the ports.

Figure 4:
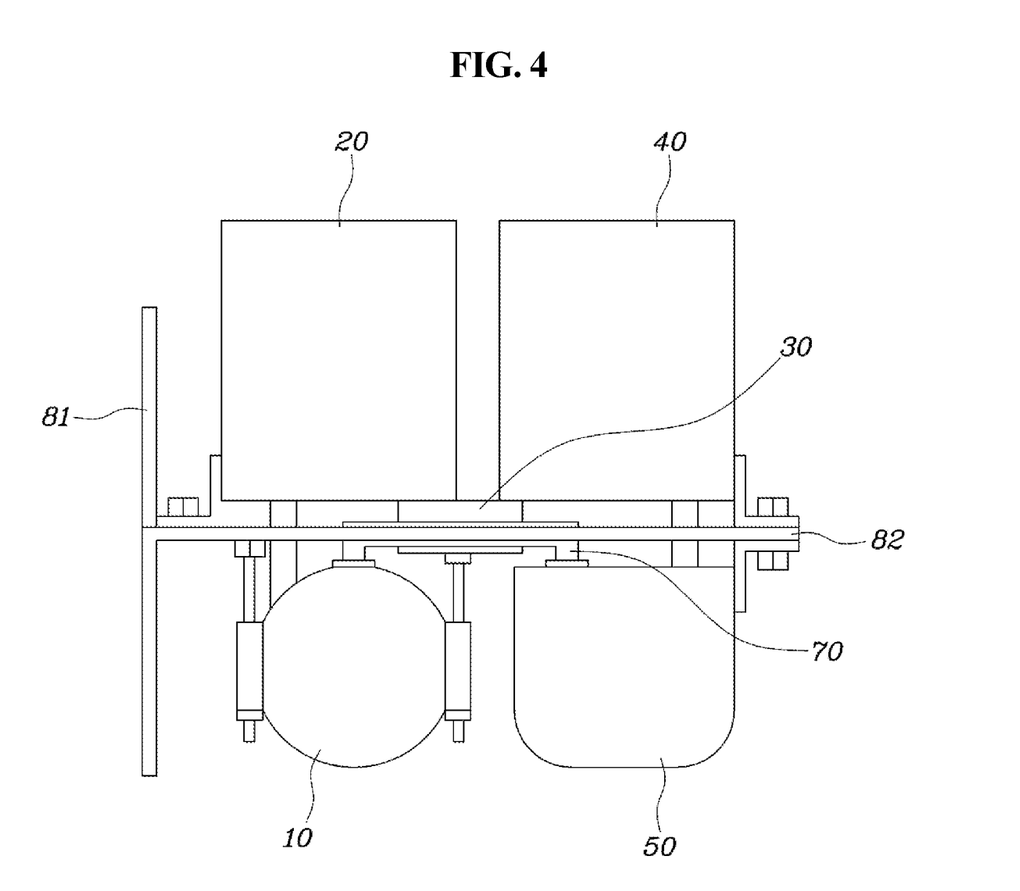
FIGS. 4 to 6 are side views illustrating the refrigerant module in various exemplary embodiments according to the present disclosure.
Figure 5:
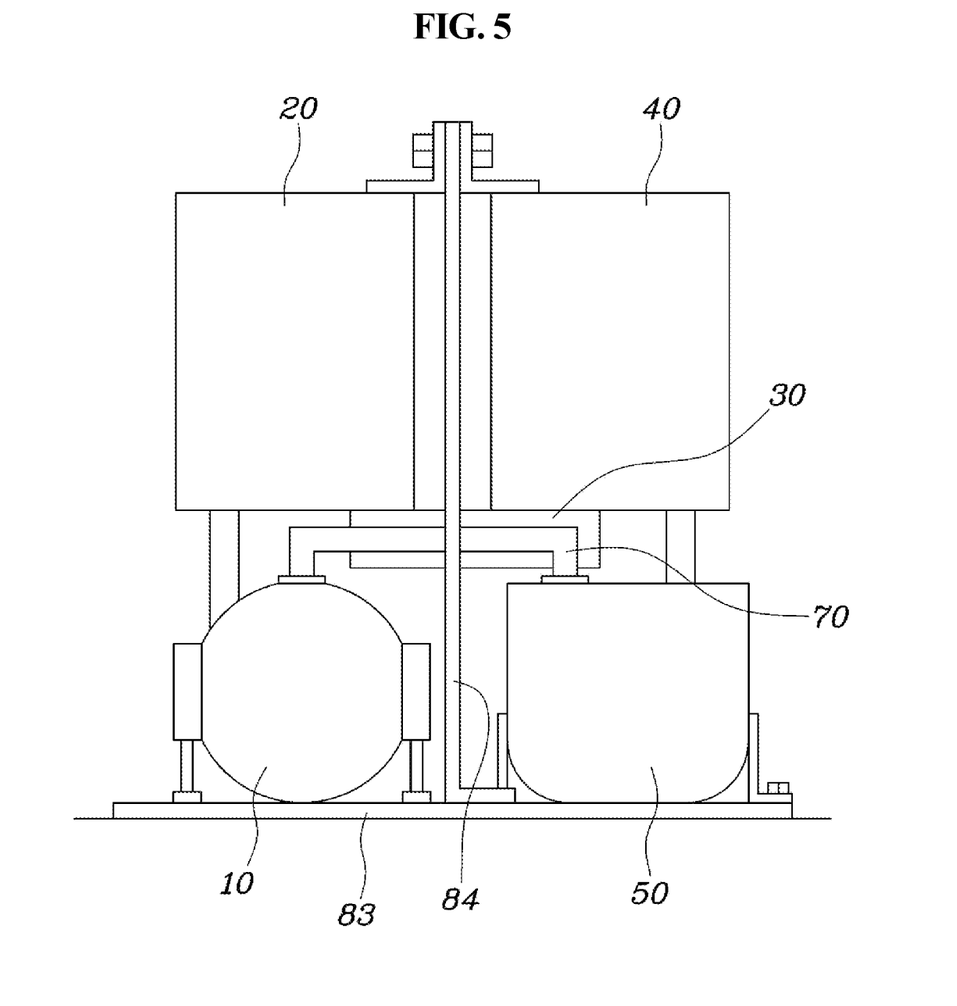
Figure 6:
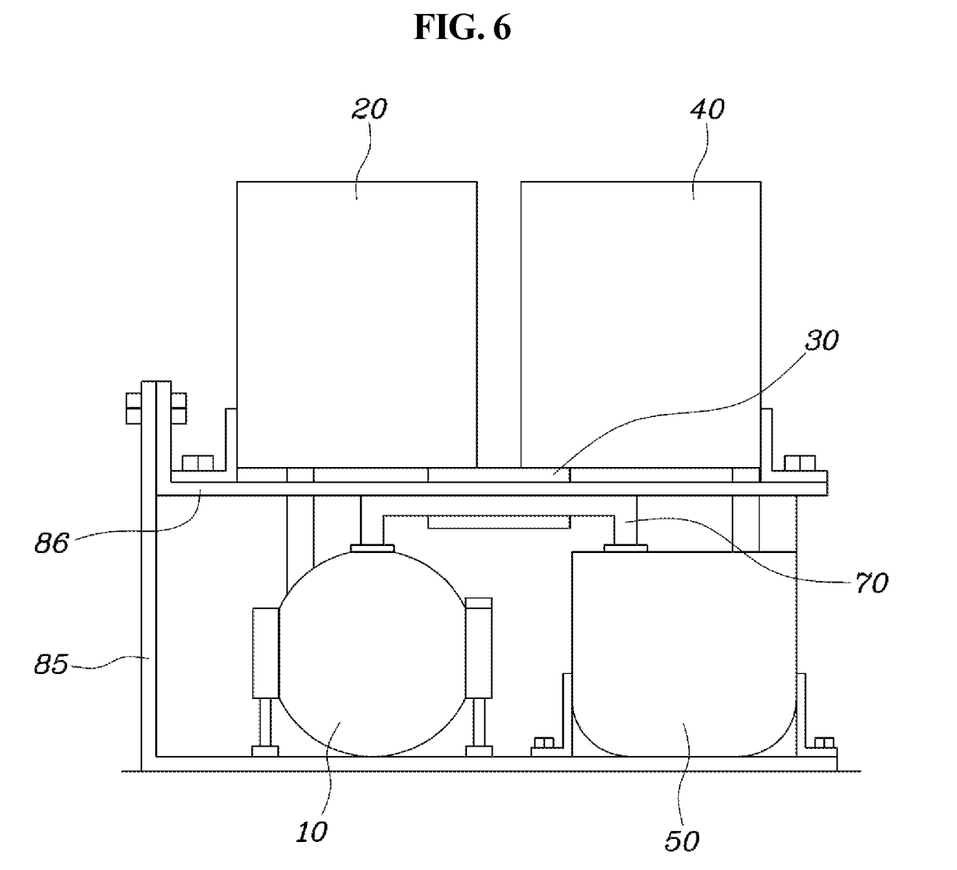

In addition, FIGS. 4 to 6 are side views illustrating the refrigerant module in various exemplary embodiments according to the present disclosure, and various forms of the fixing plate portions are illustrated in FIGS. 4 to 6.

For example, as illustrated in FIG. 4, the fixing plate portion may include a first plate 81 oriented in the vertical direction and fixed to the vehicle body of the vehicle, and may include a second plate 82 having a part thereof oriented in the vertical direction such that the part thereof is fixed to the vehicle body, the second plate 82 having other parts thereof bent and extending in the horizontal direction such that a region to which the compressor 10, the accumulator 50, the condenser 20, and the evaporator 40 are fixed is provided.

Therefore, on the second plate 82, each of the compressor 10 and the accumulator 50 is fixed to a lower surface of the region that extends in the horizontal direction, and each of the condenser 20 and the evaporator 40 is fixed to an upper surface of the region that extends in the horizontal direction. In addition, as in the exemplary embodiment described above, the opposite sides of the upper end of the expansion valve 30 are respectively fixed to the lower end portion of the condenser 20 and the lower end portion of the evaporator 30. At this time, a bracket formed in various shapes may be used to fix the compressor 10, the accumulator 50, the condenser 20, and the evaporator 40 to the second plate 82.

In addition, in the region of the second plate 82 extending in the horizontal direction, a through-hole may be formed to secure a space where the expansion valve 30 and the connection passage 70 are disposed. The shape of the through-hole may be variously formed in consideration of the expansion valve 30 and the connection of the connection passage 70.

In addition, as illustrated in FIG. 5, the fixing plate portion may include a second horizontal plate 83 oriented in the horizontal direction and fixed to the vehicle body of the vehicle, and may include a second vertical plate 84 vertically fixed to a middle portion of the second horizontal plate 83.

Therefore, each of the compressor 10 and the accumulator 50 is fixed to an upper surface of the second horizontal plate 83, and the condenser 20 and the evaporator 40 are respectively fixed to opposite side surfaces of the second vertical plate 84. In addition, as in the exemplary embodiment described above, the opposite sides of the upper end of the expansion valve 30 are respectively fixed to the lower end portion of the condenser 20 and the lower end portion of the evaporator 40. At this time, a bracket formed in various shapes may be used to fix the compressor 10, the accumulator 50, the condenser 20, and the evaporator 40 to both the second horizontal plate 83 and the second vertical plate 84. In addition, in the second vertical plate 84, a through-hole may be formed to secure a space where the expansion valve 30 and the connection passage 70 are disposed. The shape of the through-hole may be variously formed in consideration of the expansion valve 30 and the connection of the connection passage 70.

In addition, as illustrated in FIG. 6, the fixing plate portion may include a third plate 85 having a part thereof horizontally fixed to the vehicle body of the vehicle and having other parts thereof bent and extending in the vertical direction, and may be formed of a fourth plate 86 having a part thereof fixed to an upper end of a vertical portion of the third plate 85 and having other parts thereof bent and extending in the horizontal direction.

Therefore, on the third plate 85, each of the compressor 10 and the accumulator 50 is fixed to an upper surface of a region that extends in the horizontal direction. Further, on the fourth plate 86, each of the condenser 20 and the evaporator 40 is fixed to an upper surface of a region that extends in the horizontal direction. In addition, as in the exemplary embodiment described above, the opposite sides of the upper end of the expansion valve 30 are respectively fixed to the lower end portion of the condenser 20 and the lower end portion of the evaporator 30. At this time, a bracket formed in various shapes may be used to fix the compressor 10, the accumulator 50, the condenser 20, and the evaporator 40 to both the third plate 85 and the fourth plate 86.

In addition, in the region extending in the horizontal direction in the fourth plate 86, a through-hole may be formed so as to secure a space where the expansion valve 30 is disposed, a space where the first discharge port 12 of the compressor 10 and the second suction port 21 of the condenser 20 are directly connected to each other, and a space where the fourth discharge port 42 of the evaporator 40 and the fifth suction port 51 of the accumulator 50 are directly connected to each other. At this time, the shape of the through-hole may be variously formed in consideration of the expansion valve 30 and the connection of each of the ports.

Although the present disclosure has been described with reference to the accompanying exemplary drawings and the preferred exemplary embodiments described above, the present disclosure is not limited thereto but is limited by the following claims. Accordingly, those skilled in the art may variously modify and change the present disclosure without departing from the technical spirit of the following claims.

What is claimed is:

1. A refrigerant module of an integrated thermal management system for a vehicle, the refrigerant module comprising:
    a compressor having a first suction port into which a refrigerant is suctioned and having a first discharge port through which the refrigerant that is compressed is discharged;
    a condenser having a second suction port into which the refrigerant discharged from the compressor is suctioned and having a second discharge port through which the refrigerant that is heat-exchanged is discharged;
    an expansion valve having a third suction port into which the refrigerant discharged from the condenser is suctioned and having a third discharge port through which the refrigerant that is expanded is discharged;
    an evaporator having a fourth suction port into which the refrigerant discharged from the expansion valve is suctioned and having a fourth discharge port through which the refrigerant that is heat-exchanged is discharged;
    an accumulator having a fifth suction port into which the refrigerant discharged from the evaporator is suctioned and having a fifth discharge port through which the refrigerant separated into liquid and gas phases is discharged; and
    a connection passage enabling the refrigerant discharged from the accumulator to flow to the compressor;
    wherein the refrigerant module is configured such that a refrigerant circulates through the compressor, the condenser, the expansion valve, the evaporator, and the accumulator,
    wherein the first discharge port of the compressor is directly connected to the second suction port of the condenser, the second discharge port of the condenser is directly connected to the third suction port of the expansion valve, the third discharge port of the expansion valve is directly connected to the fourth suction port of the evaporator, the fourth discharge port of the evaporator is directly connected to the fifth suction port of the accumulator, and the fifth discharge port of the accumulator is indirectly connected to the first suction port of the compressor by the connection passage; and
    wherein the first discharge port is oriented in an upward direction from an upper end portion of the compressor, the second suction port is oriented in a downward direction from a lower end portion of the condenser, and the second suction port of the condenser is disposed directly above the first discharge port of the compressor such that the first discharge port and the second suction port are directly connected to each other and are in communication with each other.

2. The refrigerant module of claim 1, wherein the second discharge port is oriented in a downward direction from a lower end portion of the condenser, the third suction port is oriented in an upward direction from an upper end portion of the expansion valve, and the third suction port of the expansion valve is disposed directly below the second discharge port of the condenser such that the second discharge port and the third suction port are directly connected to each other and are in communication with each other.

3. The refrigerant module of claim 1, wherein the third discharge port is oriented in an upward direction from an upper end portion of the expansion valve, the fourth suction port is oriented in a downward direction from a lower end portion of the evaporator, and the fourth suction port of the evaporator is disposed directly above the third discharge port of the expansion valve such that the third discharge port and the fourth suction port are directly connected to each other and are in communication with each other.

4. The refrigerant module of claim 1, wherein the fourth discharge port is oriented in a downward direction from a lower end portion of the evaporator, the fifth suction port is oriented in an upward direction from an upper end portion of the accumulator, and the fifth suction port of the accumulator is disposed directly below the fourth discharge port of the evaporator such that the fourth discharge port and the fifth suction port are directly connected to each other and are in communication with each other.

5. The refrigerant module of claim 1, wherein the fifth discharge port is oriented in an upward direction from an upper end portion of the accumulator, the first suction port is oriented in an upward direction from an upper end portion of the compressor, and the fifth discharge port of the accumulator and the first suction port of the compressor are disposed to be spaced apart from each other in a horizontal direction and are indirectly connected to each other by the connection passage.

6. The refrigerant module of claim 5, wherein the connection passage is formed in a hollow pipe shape so that the refrigerant flows through an internal portion of the connection passage, the connection passage has a first end thereof provided with a suction flange that is directly connected to the fifth discharge port of the accumulator and has a second end thereof provided with a discharge flange that is directly connected to the first suction port of the compressor, and opposite side end regions of the connection passage are bent downward, so that the suction flange is disposed directly above the fifth discharge port of the accumulator and the discharge flange is disposed directly above the first suction port of the compressor.

7. The refrigerant module of claim 1, further comprising a fixing plate portion that is configured to fix the compressor, the condenser, the expansion valve, the evaporator, and the accumulator.

8. The refrigerant module of claim 7, wherein the compressor and the accumulator are disposed side by side in a horizontal direction, the condenser and the evaporator are disposed side by side in the horizontal direction on a region above the compressor and the accumulator, and the fixing plate portion comprises a first vertical plate oriented in a vertical direction and fixed to a vehicle body of the vehicle, and a first horizontal plate horizontally fixed to a middle portion of the first vertical plate, wherein the compressor and the accumulator are fixed to a lower surface of the first horizontal plate, the condenser and the evaporator are fixed to an upper surface of the first horizontal plate, and opposite sides of an upper end of the expansion valve are respectively fixed to a lower end portion of the condenser and a lower end portion of the evaporator.

9. The refrigerant module of claim 7, wherein the compressor and the accumulator are disposed side by side in a horizontal direction, the condenser and the evaporator are disposed side by side in the horizontal direction on a region above the compressor and the accumulator, and the fixing plate portion comprises a second horizontal plate oriented in a horizontal direction and fixed to a vehicle body of the vehicle, and a second vertical plate vertically fixed to a middle portion of the second horizontal plate, wherein the compressor and the accumulator are fixed to an upper surface of the second horizontal plate, the condenser and the evaporator are respectively fixed to opposite side surfaces of the second vertical plate, and opposite sides of an upper end of the expansion valve are respectively fixed to a lower end portion of the condenser and a lower end portion of the evaporator.

* * * * *